United States Patent [19]
Fennell et al.

[11] Patent Number: 5,634,535
[45] Date of Patent: Jun. 3, 1997

[54] COMPOSITE BRAKE DISC

[75] Inventors: Thomas G. Fennell, Coventry; Ronald Fisher, Rugby; David C. Johnson, Kenilworth; Lynda M. Perks, Tamworth, all of England

[73] Assignee: Dunlop Limited, London, England

[21] Appl. No.: 613,122

[22] Filed: Mar. 8, 1996

[30] Foreign Application Priority Data

Mar. 10, 1995 [GB] United Kingdom .................. 9504904

[51] Int. Cl.⁶ .................................................. F16D 55/36
[52] U.S. Cl. .................. 188/73.2; 188/218 XL; 188/251 A
[58] Field of Search ............ 188/218 XL, 73.2, 188/251 R, 251 A, 71.5, 251 M, 73.1; 192/107 M, 107 R, 70.14; 156/169; 428/37, 66.6, 66.7

[56] References Cited

U.S. PATENT DOCUMENTS

| | | |
|---|---|---|
| 3,552,533 | 1/1971 | Nitz et al. . |
| 3,639,197 | 2/1972 | Spain . |
| 3,759,353 | 9/1973 | Marin . |
| 3,934,686 | 1/1976 | Stimson et al. . |
| 3,972,395 | 8/1976 | Jannasch et al. .................. 188/251 A |
| 5,242,746 | 9/1993 | Bommier et al. ....................... 428/252 |
| 5,273,140 | 12/1993 | Berwanger . |
| 5,398,784 | 3/1995 | Haneda et al. ..................... 188/218 XL |

FOREIGN PATENT DOCUMENTS

| | | |
|---|---|---|
| 1290553 | 9/1972 | United Kingdom . |
| 1358869 | 3/1974 | United Kingdom . |

OTHER PUBLICATIONS

Preliminary Search Report, dated Nov. 6, 1996, issued in French patent application FR 9602969, which corresponds to above–identified U.S. patent application serial No. 08/613,122.

*Primary Examiner*—Douglas C. Butler
*Attorney, Agent, or Firm*—Watson Cole Stevens Davis, P.L.L.C.

[57] ABSTRACT

In a composite brake disc such as a carbon composite brake disc having reinforcement provided by layers of carbon fibre material, the drive region is provided with additional reinforcement to that of the friction region by laying or otherwise providing additional fibre reinforcement material substantially uniformly in the drive region.

26 Claims, 4 Drawing Sheets

SEGMENTS CUT IN 0° DIRECTION

SEGMENTS CUT IN 90° DIRECTION

COMPOSITE BRAKE DISC

This invention relates to composite brake discs generally and more particularly but not exclusively to carbon-carbon composite brake discs adapted for use in a disc stack of an aircraft disc brake assembly and to methods of manufacturing the aforesaid discs.

The form and construction of aircraft brake assemblies is well known and ordinarily comprises a disc stack having a plurality of annular nonrotatable stator discs interleaved with annular rotatable rotor discs and thrust applying means arranged to displace the disc stack so as to bring the stator and rotor discs into frictional engagement. Discs of the stack must be able to generate friction forces and withstand torque loads, heat generated and the axial 'thrust' load applied to them upon brake actuation.

Typically, the stator discs are each in a form of an annular composite disc having a radially outer annular friction region on at least one face of the disc and radially inwardly thereof a drive region of generally annular form interrupted by a plurality of radially spaced apart keyways extending radially outwardly from the inner periphery of the disc and adapted to key with and be slidable relative to splines of a torque tube forming part of the disc brake assembly. In the case of a double stator disc axial side faces of the annular friction region are adapted to be in frictional engagement with opposing faces of adjacent rotor discs and the sub-surface structure of the friction region should efficiently dissipate by thermal conduction heat generated at the axial side faces. The drive region is adapted to transmit load between the friction region and the torque tube and must be able to survive the attendant shear forces throughout its structure and the compression forces which arise at the side faces of the keyways in contact with the splines of the torque tube.

Similarly, the rotor discs are each in the form of an annular carbon composite disc having an inner annular friction region and radially outwardly thereof a drive region of generally annular form interrupted by a plurality of radially spaced apart keyways extending radially inwardly from the outer periphery of the disc and adapted to key with and be slidable relative to drives of an aircraft wheel rotating about the central hub of the disc brake assembly. The frictional, heat dissipation and load bearing characteristics of the rotor discs are essentially the same as those afore-described characteristics required of the stator discs.

It has been appreciated that the structural characteristics of the friction region required to provide the optimum friction and heat dissipation characteristics tends to lead to a structure adjacent the keyways of the drive region unable to withstand the incident loading thereat. In particular the shear and compression loading to which the drive region at the keyways is subject may lead to compression failures and/or delamination in some cases. Consequently, for a unitary structure it is often necessary to arrive at a workable compromise which provides for adequate braking characteristics in the friction region and sufficient strength in the load bearing drive region of a brake disc.

Today, composite discs of the aforementioned types are typically of the type in which a matrix material is reinforced by filamentary material. Early examples of fibre reinforcement are disclosed in U.S. Pat. Nos. 3,552,533 and 3,759, 353 wherein discs are fabricated from a plurality of lamina of carbon fibre fabric or from filamentary carbon or carbon cloth wound helically about a central mandrel to provide an annular preform structure of the disc. However, such structures as disclosed in and as illustrated in FIGS. 6 to 11 of U.S. Pat. No. 3,759,353 may be prone to fracture in the drive regions.

Two solutions aimed at improving the load bearing characteristics of the drive regions of composite discs fabricated from helically wound carbon preforms are suggested in U.S. Pat. No. 3,552,533. In the first shown in FIGS. 4 and 5 of that Specification, wound filamentary carbon is subject to radial compression to form rudimentary keyways. However, this leads to an uneven fibre concentration in the friction region of the resulting brake disc.

The second solution suggested in U.S. Pat. No. 3,552,533 requires, as illustrated in FIG. 10 of that Specification, a differential composition of the drive region from the friction region. In that Specification it is suggested that in the case of a stator disc the central drive region can first be wound using a resin soaked first filament and subsequently the outer friction region can be wound with a resin soaked second filament together with friction tailoring agents. A variation on the same theme is disclosed in U.S. Pat. No. 3,639,197 in which for a stator disc a central wound core provides the required strength in the drive region whilst a random short fibre staple composite structure is provided for the friction region.

Other means to improve the load bearing characteristics in the portions of the drive region immediately adjacent keyways have been proposed. One such proposal in U.S. Pat. No. 5,273,140 requires that the drive regions of a disc do not provide the primary bearing surfaces against which the reaction members e g splines of the torque tube or drives of the wheel contact. Instead they provide a seating for a plurality of separate inserts which themselves have keyways substantially smaller than the seatings in which they sit. These keyways are contacted by the drives or splines and distribute the attendant loadings across the greater area of the seatings. In the Applicant's own U.S. Pat. No. 3,934,686 it has been suggested that the keyways of a disc are augmented by carbon fibre inserts, each bonded to the material of the disc, which have better load bearing characteristics than the material structure of the disc as a whole. The evident disadvantage of the aforementioned inserts is that they increase the complexity and manufacturing costs of a disc.

It is an object of the present invention to provide an improved brake disc and method of manufacture.

According to a first aspect of the invention there is provided a generally annular fibre-reinforced composite brake disc for use in a multidisc brake said disc having an annular friction region adapted in use to have an annular friction surface disposed at an axial side face of the disc and having radially of said friction region a generally annular peripheral drive region comprising arcuate portions separated by a plurality of circumferentially spaced keyways extending radially from the drive periphery of the drive region remote from said friction region and adapted in use to transmit the torque generated at the friction surface to at least one reaction member in an associated wheel and brake assembly wherein said disc comprises a plurality of laminae each substantially parallel to said friction surface said laminae each comprising an assemblage of fibres in which the plurality of laminae and the fibres therein are bonded together by a matrix material said disc characterised in that within a radial section or radial sector the fibre volume fraction is substantially constant and the fibre volume fraction in a radial sector positioned in proximity to the drive periphery radius is greater than the fibre volume fraction in a radial section positioned in proximity to the non-drive periphery radius to provide a composite brake disc wherein the strength, typically the compressive strength, of the composite material is higher in proximity to the drive periphery radius than in proximity to the non-drive periphery radius thereby to provide improved tangential load bearing characteristics in the arcuate portions of the composite disc.

The term "radial section" is used herein to refer to a thin hollow cylinder shape concentric with the major axis of a disc and the term "radial sector" refers to a circumferentially discontinuous part of a radial section.

The term "annular width" refers to the width of an annulus as measured in a radial direction from the major axis of a disc.

A reaction member may comprise a rotor drive member secured to a wheel such as a drive bar, drive key or drive block, or a stator drive member in the brake which may be a spline or tenon of the brake torque tube.

Typically a drive periphery will be the disc periphery which contains the drive means, variously described as slots, keyways or notches; the drive periphery radius will be the radius of the cylindrical edge profile of the drive periphery, i e the inner radius of a stator disc or the outer radius of a rotor disc; the non-drive periphery radius will be the inner radius of a rotor disc or the outer radius of a stator disc.

An assemblage of fibres may comprise sheets of randomly or uni-axially axially aligned fibres, woven fabric or non-woven fabric.

The additional fibre volume fraction in the drive region may be achieved by additional fibres of the same type as those used in the friction region of the disc, or by the use of additional fibres of a different type.

In a case in which the fibre material is provided in the form of layers, some layers, of one type of fibre, may be arranged to strengthen both the drive and friction regions whereas the drive region may be provided with additional strength, i e additional fibre volume fraction, by provision in that drive region of additional layers of fibre sheet material which need not be of the same type of fibre material as that extending in both of the friction and drive regions.

Preferably, strengthening of said arcuate portions is provided during fabrication of the composite structure by greater compaction of laid up laminae in the drive region than those in the friction region prior to consolidation of the laminae. The composite structure throughout the entire arcuate portions may be strengthened and each lamina may have a majority of respective fibres contained therein arranged in a common direction.

Said keyways may extend radially through the entire drive region from said drive periphery to a non-drive periphery of the drive region defining one periphery of the annular friction region.

Suitably, the fibre volume fraction of the drive region is greater than that of the friction region only in an interrupted annular reinforced portion of the drive region extending between said drive periphery and a radial position of the drive region spaced apart from the said non-drive periphery.

The fibre may be carbon fibre and the composite structure may be a carbon-carbon composite structure i e the matrix material is also carbon. In such a case the carbon fibre volume fraction may be in the order of 20% in the friction region and in the order of 25% in the strengthened drive region. The carbon fibre volume fraction may be in the order of 20% in the friction region and in the order of 27% in the strengthened drive region.

The fibre volume fraction in the drive region preferably is more than 10%, more preferably more than 20% of that in the friction region.

A laminated carbon fibre fabric preform is adapted for use in the brake disc of the first said aspect of the invention.

According to a second aspect of the invention a method of fabricating a generally annular fibre-reinforced composite brake disc having an annular friction region adapted in use to have an annular friction surface disposed axially of the disc and having radially of said friction region a generally annular peripheral drive region comprising arcuate portions separated by a plurality of circumferentially spaced keyways extending radially from the drive periphery of the drive region remote from said friction region and adapted in use to transmit the torque generated at the friction surface to at least one reaction member in an associated wheel and brake assembly in which a plurality of generally annular laminae are laid up co-axially relative to one another said laminae each comprising an assemblage of fibres characterised in that in the method, the laid up laminae are compacted axially between platens of a compression fixture to provide a laminae assembly in which the fibre volume fraction within a radial section or radial sector is substantially constant and the fibre volume fraction in a radial sector positioned in proximity to the drive periphery radius is greater than the fibre volume fraction in a radial section positioned in proximity to the non-drive periphery radius; and the laminae assembly and the fibres therein are infiltrated with and bonded together by a matrix material to provide a composite brake disc wherein the compressive strength of the composite material is higher in proximity to the drive periphery radius than in proximity to the non-drive periphery radius thereby to provide improved tangential load bearing characteristics in the arcuate portions of the composite disc.

Each lamina may have a majority of respective fibres contained therein arranged in a common direction. The composite brake disc may be machined to finished/final dimensions and/or to provide said keyways in the drive region.

Preferably, the composite brake disc has a carbon-carbon composite structure and said consolidation means comprises carbon infiltration and subsequent heat treatment of the infiltrated laminae assembly of carbon fibre.

At least one of the compression fixture platens may be provided with a stepped profile adapted to compress the drive region axially to a greater extent than the friction region.

A plurality of generally annular first lamina of fibre fabric, each having inner and outer diameters generally corresponding respectively to the inner and outer diameter of the disc, may be laid co-axially relative to one another together with a plurality of generally annular second lamina of fibre fabric, each having inner and outer diameters generally corresponding respectively to the inner and outer diameters of the drive region. The laminae may be laid one on the other in a regular sequence. The sequence may comprise four said first laminae, one said second lamina, four said first laminae and one said second lamina. Yet again, the laminae may be laid one on the other in a sequence comprising three said first laminae, one said second lamina, three said first laminae and one said second lamina.

Adjacent said first laminae a first pair of said first laminae are laid one against the other so that their respective aligned fibres are disposed so as to be relatively perpendicular and a second pair of said first laminae are laid one against the other so that their respective aligned fibres are disposed so as to be relatively perpendicular and said second pair are laid adjacent said first pair so that aligned fibres in the said second pair are disposed so as to be relatively at an angle to aligned fibres in the said first pair.

An annular assembly of fibre laminae may comprise a corresponding plurality of radial segments angularly disposed relative to one another to provide a helical annulus of carbon fibre laminae. Adjacent laminae of fibre laid helical wise may have aligned fibres of each lamina disposed at an angle to aligned fibres of radially abutting adjacent laminae. The said angle may be substantially 90°.

The method may comprise the further step of needle punching the laminae assembly to provide a free standing consolidated preform that can be moved from the compression fixture on which it is initially laid up prior to infiltration with said composite matrix material.

According to another aspect of the invention a general annular carbon composite brake disc is manufactured in accordance with the method of the aforesaid second aspect of the invention. The brake disc may comprise a carbon-carbon composite formed utilising a chemical vapour deposition process.

A brake disc in accordance with said first aspect and/or said another aspect of the invention may have the drive region impregnated with aluminjure phosphate during manufacture.

It will be understood that herein the term "carbon fibre" is taken to include filamentary carbon and any precursor filamentary material therefor, said precursor material being converted to carbon fibre before infiltration of the fibre assemblage with a matrix material, and the statements of invention, specific description and claims should be construed accordingly.

Embodiments of the invention will now be described, by way of example only, with reference to the accompanying drawings, in which.

Figure 1:
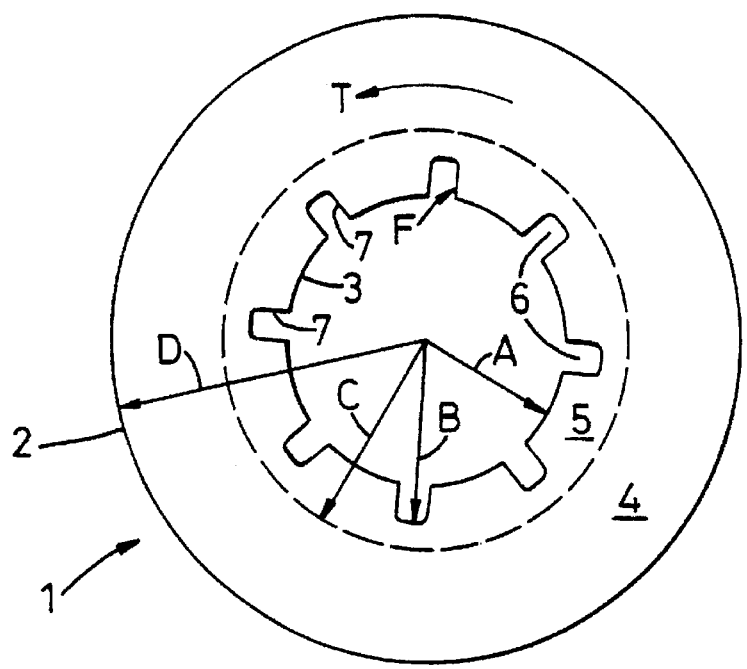
FIG. 1 illustrates in plan view a stator disc in accordance with said first aspect of the invention.

The external structure and operational requirements of the preferred embodiments shown in FIGS. 1 and 2 will now be described. Both these embodiments have a laminated structure in which a plurality of sheets of carbon fibre fabric are laminated axially relative to the disc prior to matrix infiltration by a carbon vapour deposition process for example. The preferred embodiment of stator disc 1 shown in FIG. 1 has an outer disc periphery 2 of radius D and an inner disc periphery 3 of radius A. A radially outer friction region 4 extends between the disc outer periphery 2 of radius D and radius C, and a radially inner drive region 5 extends between radius C and inner disc periphery 3 of radius A. A plurality of circumferentially spaced apart keyways 6 are formed in the drive region 5 and these extend radially outwardly from the inner disc periphery 3 of radius A to drive radius B of the drive region 5. The annular portion of the drive region 5 having radii B and C may be recessed, for example to clearly define the radially inner limit of the friction region 4.

Figure 2:
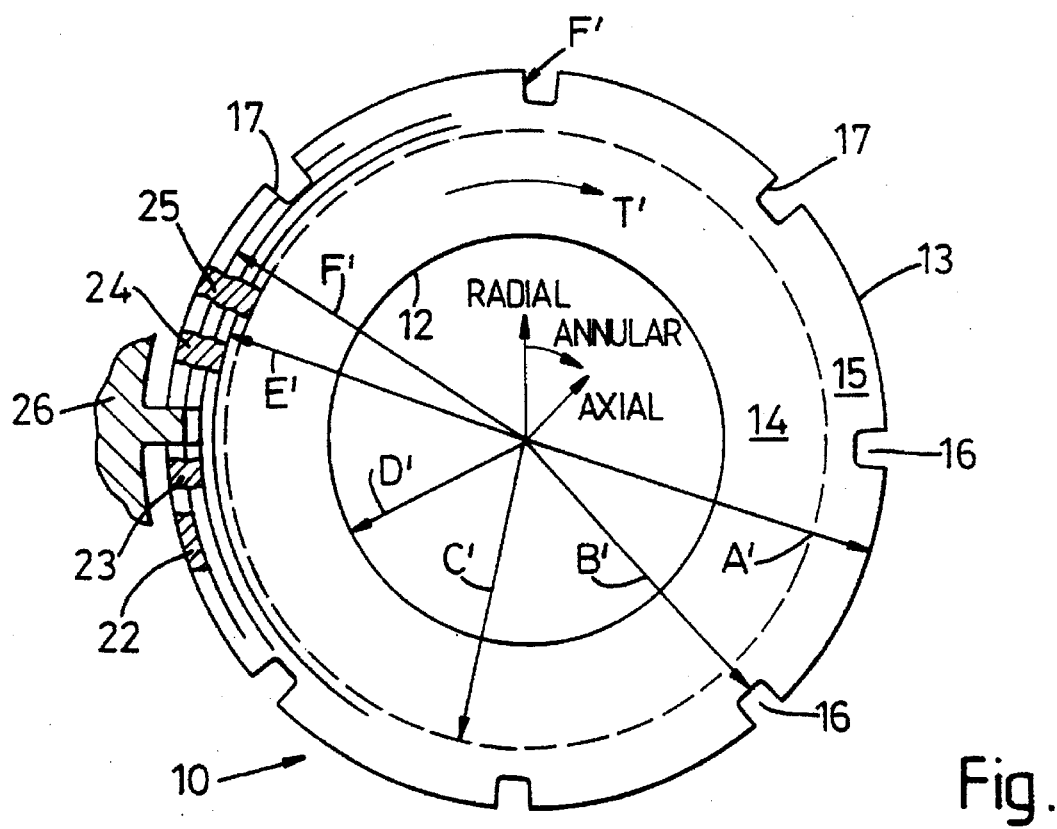
FIG. 2 illustrates in plan view a rotor disc in accordance with said first aspect of the invention.

In FIG. 2 the preferred embodiment of rotor disc 10 is illustrated which is of complementary form to the stator disc 1 shown in FIG. 1 and which in use is axially adjacent thereto. The rotor disc 10 has a radially inner friction region 14 defined by the inner disc periphery 12 of radius D' and radius C', and a radially outer drive region 15 defined by outer disc periphery 13 of radius A' and radius C'. Circumferentially spaced apart keyways 16 are provided in the drive region 14 which extend radially inwardly from the outer disc periphery 13 to drive radius B' of the drive region 15.

In use the stator disc 1 is subject to a torque T in its friction region 4 caused by frictional contact of its axial side face shown in plan view with the axial side face of adjacent rotor disc 10, i e friction region 4 is in frictional engagement with friction region 14. Consequently, rotor disc 10 is subject to an equal and opposite torque T' in its friction region 14. In the stator disc 1 the torque T is balanced by the reaction force F applied to keyways 6 by splines of a torque tube of a brake disc assembly (not shown) of which stator disc 1 and rotor disc 2 form part of the brake stack. Similarly, in the rotor disc 10 the torque T' is balanced by the reaction force F' applied to the keyways 16 by drives of an aircraft wheel (not shown) which rotates about the torque tube or hub of the brake assembly.

Clearly, the friction regions 4,14 of discs 1,10 respectively must be able to withstand the torque loadings T,T' respectively as well as providing adequate frictional characteristics at their exposed axial side faces and suitable heat dissipation characteristics in their sub-surface structure. Also, the drive regions 4,14 must be able to withstand the contact forces F,F' immediately adjacent the point of loading at leading edges 7,17 respectively of the keyways 6,16.

By analysing the structure and use of a brake disc the Applicant has determined a means of reinforcing the drive region without compromising the friction region. By suitable choice of laminae and/or constructional methods associated with the laying up of laminae the Applicant's discs 1,10 have a greater carbon fibre volume fraction density in the drive regions 5,15 than in the friction regions 4,14. The fibre volume fraction remains substantially constant throughout friction regions 4,14 thereby providing a homogenous structure therefor having desired uniform frictional and heat dissipation characteristics whilst being able to sustain the torque loadings T,T' respectively to which they are subject. The drive regions 5,15 are strengthened/reinforced by virtue of the greater carbon fibre volume fraction and the leading edges 7,17 of keyways 6,16 respectively are better able to sustain the loadings F,F' without compression failure or delamination. This leads to a final composite structure in which the overall composite density is less in the drive regions than in the friction regions because the density of the carbon fibres is generally less than that of the deposited carbon matrix material. The lower fibre volume fraction in the friction region also means that the thermal conductivity and thermal diffusivity are higher, particularly in the direction perpendicular to the friction surface.

In other embodiments of the first aspect of the invention (not shown) the drive regions 5,15 are reinforced, i e have a greater carbon fibre volume fraction than the friction regions 4,14 respectively, only between the disc periphery 3,13 of radius A,A' respectively and the drive radius B,B' respectively. Thus, only the portions of the drive regions 5,15 between radii A,A' and B,B' respectively which are subject to compression loadings due to loadings F,F' respectively are reinforced. This it is desirable to reinforce the portions of the drive regions 5,15 between radii B,B' and C,C' respectively if the axial thickness of the said portions are reduced by the presence of annular grooves/recesses on the disc surfaces which delineate the edges of the friction regions.

In yet other embodiments of the invention (not shown) similar to said other embodiments the portions of the drive regions between radii B,B' and C,C' respectively which withstand the torques T,T' in the friction regions 5,15 respectively have the same homogenous structure as the friction regions thereby aiding heat dissipation.

In one method of preparing discs similar to those shown in FIGS. 1 and 2, laminae of aligned carbon fibre fabric, i e wherein a majority of the fibres of which are arranged in a common direction, are pre-cut from a sheet and laid one on top of another about a central bung of a jig. When lay up is completed the lay up bung is removed and the laminae assembly is restrained in a compression fixture in which the platens have a stepped profile to compress the drive region and thereby increase the carbon fibre volume fraction thereof to a greater extent than that of the friction region. It will be appreciated that dependent on the aforesaid stepped platen profile that the whole of the drive region can be compressed or more preferably only that portion thereof corresponding to the arcuate sections intermediate keyways of the disc. The compressed assembly is then subjected to a carbon vapour deposition step and the infiltrated disc is further heat treated at temperatures in the order of 2400° C. to result in the final carbon-carbon composite structure. Subsequently, the disc is machined to final dimensions by providing the required keyways and by removing excess material from the axial faces of the friction region and/or drive region.

In an alternative method the compressed assembly held in the compression fixture or a press is subjected to a needling process so that it can be removed therefrom as a free-standing preform prior to carbonisation, for example.

Figure 3A:
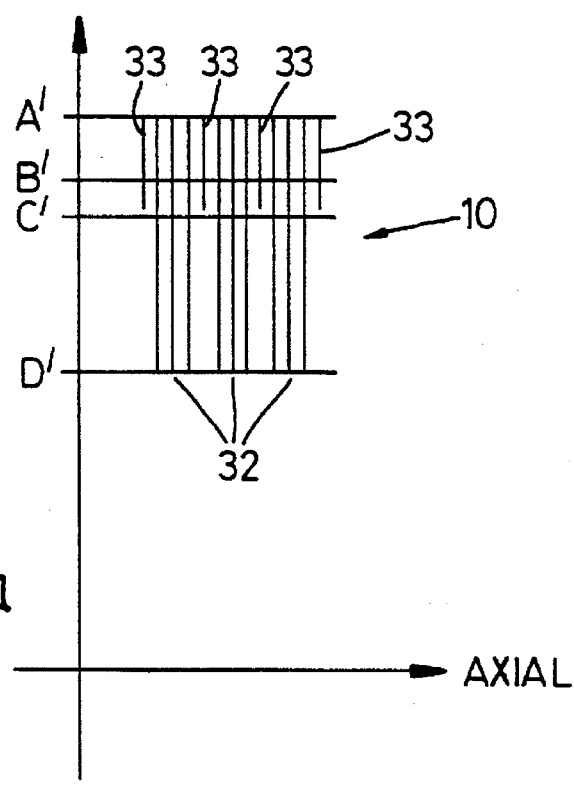
FIGS. 3a and 3b illustrate diagrammatically the laminate structure of a disc in accordance with another aspect of the invention both prior to and subsequent to a compression step of that aspect.
Figure 3B:
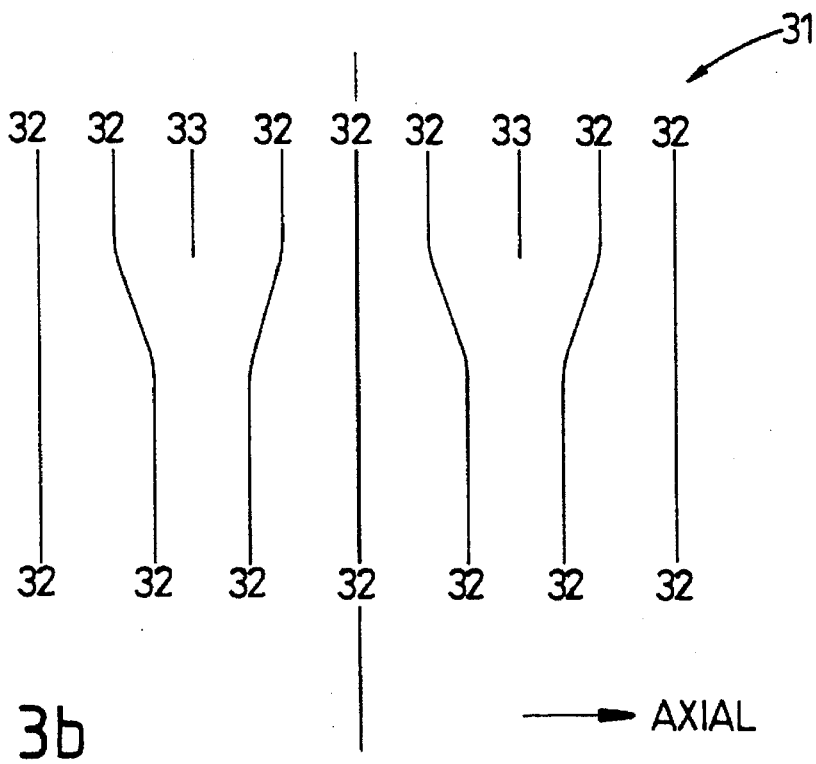

In yet another method of providing a disc, such as that illustrated in FIG. 1 or in FIG. 2, reinforcement in the drive region is provided by introducing discrete extra lamina in that region prior to a compression step. Referring now to FIGS. 3a and b this shows, at 3a for a part of a rotor disc 10, an upper half axial cross-section prior to the compression step and, at 3b, after said compression step respectively of annular laminae therefor. The disc is fabricated by laying up a plurality of full width annuli 32 interleaved with an associated plurality of reduced width annuli 33. Full width annuli 32 extend from the outer to inner disc peripheries radii A' to D', i e across the drive and friction regions of the disc, whilst reduced width annuli extend from outer disc periphery radius A' to between drive periphery radius B' and the radial extent of the drive region radius C', i e substantially across the drive region only and more particularly across at least that portion of the drive region corresponding to the arcuate sections intermediate keyways of the disc.

Typically, three full width annuli 32 are laid for each reduced width annulus 33. In an alternative construction four annuli 32 are laid for each reduced width annulus 33. Once the laminae have been laid up they are placed in a press and compressed to a desired axial width t shown diagrammatically at the axial cross-section 3b. The resulting laminae assembly can then be infiltrated to produce the composite structure in which keyways can then be machined.

In a further embodiment of the invention the radial extent of the additional reinforcement of the drive region is restricted to that part of the drive region that abuts the reaction means, i e does not extend to the root of the keyway.

Figure 4:
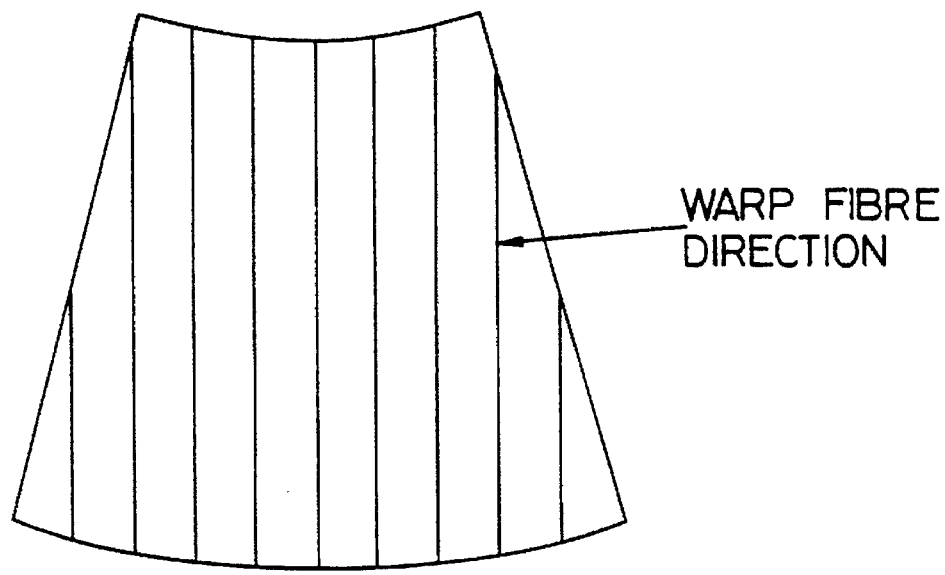
FIG. 4 illustrates diagrammatically a laminate segment used in the construction of one embodiment of the invention.
Figure 5:
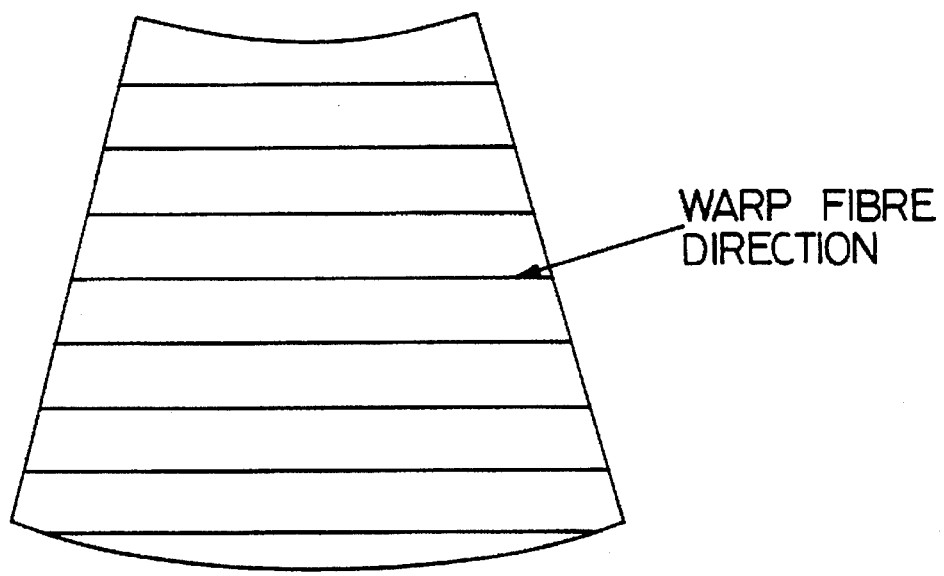
FIG. 5 illustrates diagrammatically another laminate segment used together with the segment shown in FIG. 4 in the construction of the same one embodiment of the invention.

It will be understood that cutting complete annular laminae from a sheet of aligned carbon fibre fabric results in considerable wastage of material. To reduce wastage it is desirable that each laminate is made up from a plurality of radial segments such as those illustrated in FIGS. 4 and 5 which can be laid radially disposed of one another to form a complete annulus or annulus having spiral overlaps. These can be cut from a sheet in a manner which reduces wastage. Typically, segments such as those illustrated in FIG. 4 have warp fibres aligned in one direction whilst segments such as those illustrated in FIG. 5 have warp fibres aligned in another mutually perpendicular direction. In fabricating a brake disc full width annuli 32 made up from segments as shown in FIG. 4 and FIG. 5 respectively are laid immediately adjacent one another. Interleaved reduced width annuli 33, or reduced width segments thereof (not shown) wherein fibres thereof aligned in a common direction are arranged as shown in FIGS. 4 and 5, are similarly interspersed with full width segments in a regular fashion to facilitate the eventual desired increase in fibre volume fraction.

Figure 6:
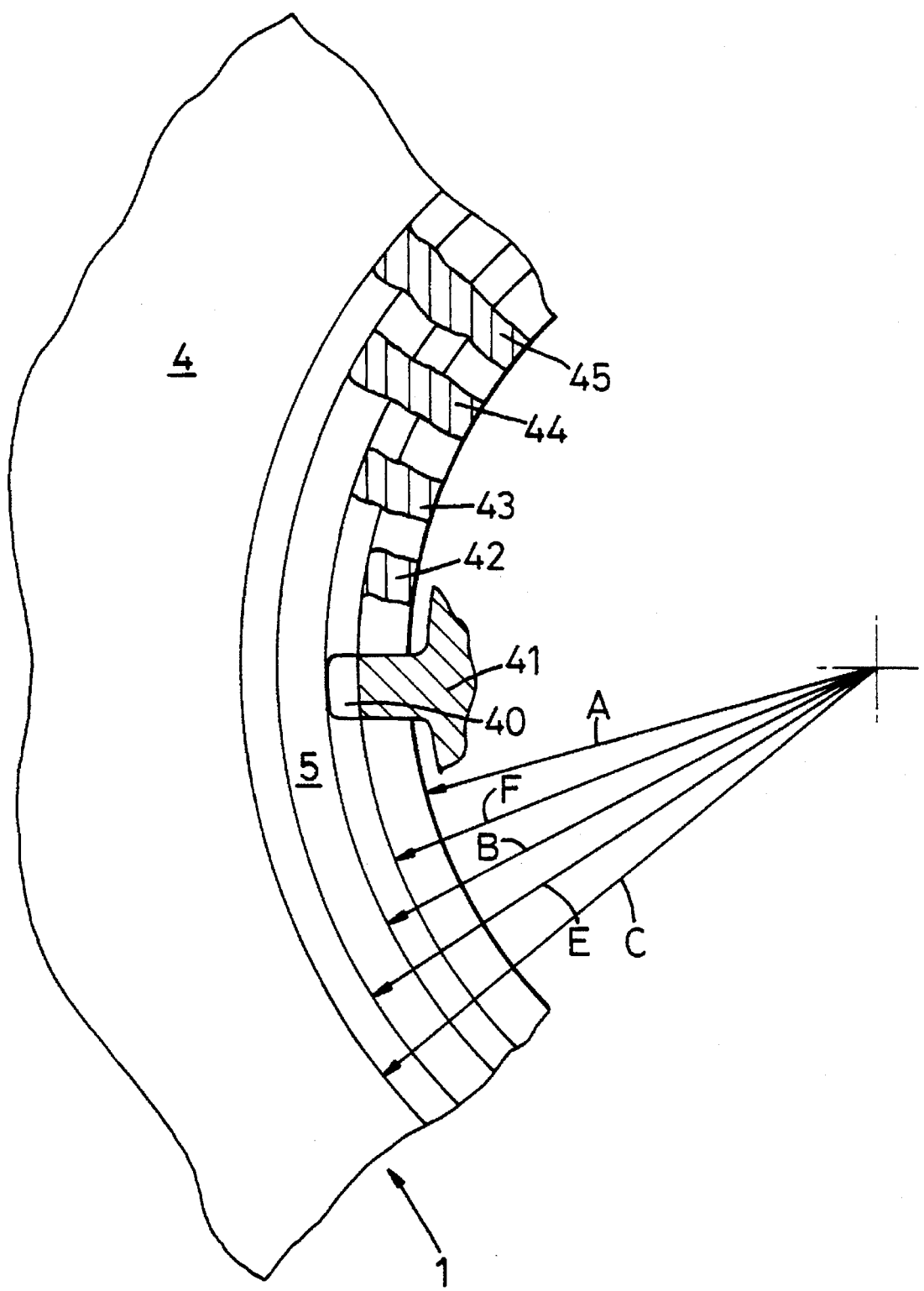
FIG. 6 shows part of a stator disc including part of the drive region.

FIG. 6 illustrates diagrammatically the relationship between the reaction member 41, the keyway 40 and the radial extent of the additional reinforcement in a stator disc. Thus, as shown in FIGS. 2 and 6, the radial extent of the zone containing the higher volume fraction of the fibres may extend radially from the drive periphery radius A,A' to the radius F,F' of the reaction member 41, or to the root of the keyway B,B', or to the edge of the friction region C,C', or to a radial position E,E' intermediate between C,C' and B,B' corresponding to zones (22,42), (23,43), (25,45) and (24,44) respectively.

To further improve the reinforcement in the drive region of the disc it has been suggested that impregnation with aluminium phosphate during manufacture would desirably enhance the load bearing characteristics of the drive region.

The following description is of examples which have been fabricated by the Applicant to verify empirically the improved strength of their reinforced discs in comparison to standard discs having a homogenous structure across both the friction and drive regions thereof.

EXAMPLE 1

A segmented stator disc having an outer disc periphery diameter 13.420 inches (2×radius D), inner disc periphery diameter 5.755 inches (2×radius A) and thickness t=1.800 inches was fabricated from segments cut from non-woven carbon fabric of 400 grammes per meter squared and oriented as illustrated in FIGS. 4 and 5 using 612 grammes of 0° segments and 612 grammes of 90° segments. In addition annuli of 5.500 inches internal diameter and 7.680 inches outside diameter were cut from the same fabric to be incorporated at intervals during the laying up of the disc to increase the fibre volume fraction in the portion of the drive region corresponding to the arcuate sections intermediate keyways of the disc. The inside diameter of the reduced width annuli were cut slightly smaller than the disc inner periphery to allow for stretch of the fabric during laying up.

Four layers of segments were laid up spiral fashion about a central bung followed by one layer of the reduced width annuli oriented in the 0° reference direction. Another four layers of segments were placed around the bung, and another reduced width annulus was placed on top of these at 35° to the orientation of the first reduced width annulus. This lay up method was repeated until all the segments were used with reduced width annuli being positioned every fourth layer at 35° to the previous reduced width annulus.

When lay up was completed the lay up bung was removed and the laminae assembly was compressed in a suitable fixture to achieve 20% fibre volume fraction in the bulk of the assembly and 25% fibre volume fraction in the drive region adjacent the inner diameter. The assembly was infiltrated with carbon by chemical vapour deposition, taken from the compression fixture and further infiltrated to give a density of over 1.8 grammes per cubic centimeter. The infiltrated disc was then heat treated to 2400° C. in an inert atmosphere and machined to final dimensions.

EXAMPLE 2

A stator disc having had an outer disc periphery diameter 11.29 inches (2×radius D), inner disc periphery diameter 4.71 inches (2×radius A) and thickness t of 0.720 inches was fabricated from full width annuli cut from non-woven carbon fabric segments of 400 grammes per meter squared using 352 grammes of fabric. In addition annuli of 4.50 inches internal diameter and 6.20 inches outside diameter were cut from the same fabric to be incorporated at intervals during the laying up of the disc to increase the fibre volume fraction in the arcuate portions of the drive region intermediate keyways of the disc. The inside diameter of the reduced width annuli were cut slightly smaller than the disc inner periphery to allow for stretch of the fabric during laying up.

Four layers of full width annuli were laid up about a central bung, i e at 0/90/35/125 ° relative orientation, followed by one layer of the reduced width annuli in the same orientation as the preceding full width annulus. Another four layers of full width annuli were placed around the bung continuing with the 0/90/35° orientation sequence, and another reduced width annulus was placed on top of these at the same orientation as the preceding full width annulus. This lay up method was repeated until all the segments were used with reduced width annuli being positioned every fourth layer.

When lay up was completed the lay up bung was removed and the laminae assembly was compressed in a suitable fixture to achieve 20% fibre volume fraction in the bulk of the disc and 25% fibre volume fraction in the drive region adjacent the inner diameter. The assembly was infiltrated with carbon by chemical vapour deposition, taken from the compression fixture and further infiltrated to give a density of over 1.8 grammes per cubic centimeter. The infiltrated disc was then heat treated to 2400 ° C. in an inert atmosphere and machined to final dimensions.

EXAMPLE 3

A stator disc having an outer periphery diameter 11.29 inches (2×radius D), inner disc periphery diameter 4.71 inches (2×radius A) and thickness t=0.720 inches was fabricated from full width annuli cut from non-woven carbon fabric of 400 grammes per meter squared using 352 grammes of fabric. In addition annuli of 4.50 inches internal diameter and 6.20 inches outside diameter were cut from the same fabric to be incorporated at intervals during the laying up of the disc to increase the fibre volume fraction of the drive region arcuate portion intermediate keyways of the disc. The inside diameter of the reduced width annuli were cut slightly smaller than the disc inner periphery to allow for stretch of the fabric during laying up.

Three layers of full width annuli were laid up about a central bung, i e at 0/90/35° relative orientation, followed by one layer of the reduced width annuli oriented in the same direction as the preceding full width annulus. Another three layers of full width annuli were placed around the bung continuing the 0/90/35/125° orientation sequence, and another reduced width annulus was placed on top of these at the same orientation as the preceding full width annulus. This lay up method was repeated until all the annuli were used with reduced width annuli being positioned every third layer.

When lay up was completed the lay up bung was removed and the laminae assembly was compressed in a suitable fixture to achieve 20% fibre volume fraction in the bulk of the disc and 27% fibre volume fraction in the drive region adjacent the inner diameter. The assembly was infiltrated with carbon by chemical vapour deposition, taken from the compression fixture and further infiltrated to give a density of over 1.8 grammes per cubic centimeter. The infiltrated disc was then heat treated to 2400 ° C. in an inert atmosphere and machined to final dimensions.

EXAMPLE 4

A stator disc having had an outer disc periphery diameter 13.420 inches (2×radius D), inner disc periphery diameter 5.755 inches (2×radius A) and thickness t=1.80 inches was fabricated from segments cut from non-woven carbon fabric segments of 400 grammes per meter squared and oriented as illustrated in FIGS. 4 and 5 using 612 grammes of 0° segments and 612 grammes of 90° segments. The laminate disc was laid up spiral fashion by alternating 0 and 90° segments around a central bung. When laying up was completed the bung was removed, the laminae assembly was positioned between two platens with identical steps at the internal diameter to result in local increase in the fibre volume fraction in the arcuate portions of the drive region intermediate the keyways when the assembly was compressed in a suitable fixture.

Following compression, the fibre volume fraction in the friction regions was 20% and as a result as the additional local compression in the drive region the fibre volume fraction was 25%. The step in each plate was 0.180 inches high with 7.625 inches outside diameter and 5.775 inches inside diameter. A radius was machined in the outside diameter at the top 0.10 inches to smooth the transition in fibre volume at the edge of the drive region of the disc. The assembly was infiltrated with carbon by chemical vapour deposition, taken from the compression fixture and further infiltrated to give a density of over 1.8 grammes per cubic centimeter. It was then heat treated to 2400° C. in an inert atmosphere and machined to final dimensions.

EXAMPLE 5

A standard "homogenous" stator disc having an inner disc periphery diameter of 4.71 inches and outer periphery diameter 11.29 inches and thickness 0.720 inches was fabricated from annuli cut from a non-woven carbon fabric of 400 grammes per meter squared using 352 grammes of fabric. The annuli were laid up in a 0-90/35° orientation sequence around a central bung until all the annuli were used. When lay up was completed the lay up bung was removed and the laminae assembly was compressed in a suitable fixture to achieve a homogenous 20% fibre volume fraction throughout the disc. The laminae assembly was then infiltrated with carbon by chemical vapour deposition, taken from the compression fixture and further infiltrated to give a density of over 1.8 grammes per cubic centimeter. The infiltrated disc was then heat treated to 2400 ° C. in an inert atmosphere and machined to final dimensions.

Examples 2, 3 and 5 were tested to establish the relative comparative strengths of the drive regions thereof. A section cut from each disc can be mounted on a dynamometer and a torque applied to load the drive to failure thereby simulating the load produced during brake operation. The results produced by six tests on drive samples from each of Examples 2, 3 and 5 are shown in the following table where each drive sample was tested to failure:

|  | % Fibre Volume in drive Region | Torque in lb. ft at failure | | | | | | Average |
| --- | --- | --- | --- | --- | --- | --- | --- | --- |
|  |  | 1 | 2 | 3 | 4 | 5 | 6 |  |
| Example 5 | 20 | 228 | 250 | 209 | 251 | 255 | 234 | 238 |
| Example 2 | 25 | 396 | 400 | 373 | 324 | 335 | 352 | 363 |
| Example 3 | 27 | 403 | 392 | 396 | 401 | 339 | 341 | 378 |

As can be observed from the abovetabled results the increase in fibre volume fraction in the area of the drive region intermediate the keyways provided by the invention leads to a substantially more robust laminated structure than the typical uniform homogenous structure of a disc such as Example 5.

The aforedescribed embodiments comprise carbon reinforced carbon fibre fabric. It will be understood that the invention is applicable and the ambit of the claims is taken to embrace the use of any other fibre fabric and/or matrix material that is or may become available for use in brake disc manufacture.

We claim:

1. A brake disc for use in a multi-disc brake said disc having an annular friction region adapted in use to have an annular friction surface disposed at an axial side face of the disc and having radially of said friction region a generally annular peripheral drive region comprising arcuate portions separated by a plurality of circumferentially spaced keyways extending radially from the drive periphery of the drive region remote from said friction region and adapted in use to transmit the torque generated at the friction surface to at least one reaction member in an associated wheel and brake assembly wherein said disc comprises a plurality of laminae each substantially parallel to said friction surface said laminae each comprising an assemblage of fibres in which the plurality of laminae and the fibres therein are bonded together by a matrix material said disc wherein within a radial section or radial sector the fibre volume fraction is substantially constant and the fibre volume fraction in a radial sector positioned in proximity to the drive periphery radius is greater than the fibre volume fraction in a radial section positioned in proximity to the non-drive periphery radius to provide a composite brake disc wherein the, strength of the composite material is higher in the proximity of the drive periphery radius than in the proximity of the non-drive periphery radius thereby to provide improved tangential load bearing characteristics in the arcuate portions of the composite disc.

2. A brake disc in accordance with claim 1 wherein the annular width of the radial sector positioned in proximity to the drive periphery radius is at least substantially equal to the radial depth of the contact face of the reaction member.

3. A brake disc in accordance with claim 1 wherein the radial section in proximity to the non-drive periphery radius extends across the whole of the friction region and the fibre volume fraction throughout the whole of the peripheral drive region is greater than that of the friction region.

4. A brake disc in accordance with claim 1 wherein strengthening of said arcuate portions is provided during fabrication of the composite structure by greater axial compaction of laid up laminae in at least part of the drive region than those in the friction region prior to bonding of the laminae.

5. A brake disc in accordance with claim 1 wherein the composite structure throughout the entire arcuate portions is strengthened.

6. A brake disc in accordance with claim 1 wherein each laminae has at least 50% of the fibres contained therein arranged in a common direction.

7. A brake disc in accordance with claim 1 wherein the fibre is carbon fibre and the composite structure is a carbon-carbon composite structure.

8. A brake disc in accordance with claim 1 wherein the fibre volume fraction in the drive region is at least 10% greater than the fibre volume fraction in the friction region.

A brake disc in accordance with claim 1 wherein at least some of the fibres in the drive region are of a material different from that of the fibres which strengthen the friction region.

9. A brake disc in accordance with claim 1 wherein at least some of the fibres in the drive region are of a material different from that of the fibres which strengthen the friction region.

10. A brake disc in accordance with claim 1 in which first laminae of fibre extend across the whole annular width of the disc and second laminae of fibre abutting the drive periphery radius extend across only part of the annular width of the disc, and in at least part of the drive periphery region not more than four said first laminae are positioned in an axially adjacent stack and successive said stacks are axially separated by a said second laminae.

11. A brake disc in accordance with claim 10 wherein said first and said second laminae are positioned at an angle of 35 degrees.

12. A brake disc according to claim 1 in which each laminae has a majority of respective fibres contained therein arranged in a common direction, a first pair of adjacent first laminae extend across the whole annular width of the disc and are disposed such that their respective aligned fibres are disposed relatively perpendicular, a second pair of said first laminae are positioned adjacent said first pair and are disposed such that the aligned fibres in the second pair are relatively at an angle to aligned fibres in the said first pair and at regular intervals a second annular laminae of fibre abutting the drive periphery radius extending across only part of the annular width of the disc is positioned in a regular angular alignment with the adjacent said first laminae.

13. A brake disc in accordance with claim 1 wherein it comprises carbon-carbon composite formed utilising a chemical vapour deposition process.

14. A brake disc in accordance with claim 1 wherein the drive region is impregnated with aluminum phosphate manufacture.

15. The brake disc of claim 1, wherein said strength is compressive strength.

16. A brake disc for use in a multi-disc brake said disc having an annular friction region adapted in use to have an annular friction surface disposed at an axial side face of the disc and having radially of said friction region a generally annular peripheral drive region comprising arcuate portions separated by a plurality of circumferentially spaced keyways extending radially from the drive periphery of the drive region remote from said friction region and adapted in use to transmit the torque generated at the friction surface to at least one reaction member in an associated wheel and brake assembly wherein said disc comprises a plurality of laminae each substantially parallel to said friction surface said laminae each comprising an assemblage of fibres in which the plurality of laminae and the fibres therein are bonded together by a matrix material said disc wherein within a radial section or radial sector the fibre volume fraction is substantially constant and the fibre volume fraction in a radial sector positioned in proximity to the drive periphery radius is greater than the fibre volume fraction in a radial section positioned in proximity to the non-drive periphery radius to provide a composite brake disc wherein the, strength of the composite material is higher in the proximity of the drive periphery radius than in the proximity of the non-drive periphery radius thereby to provide improved tangential load bearing characteristics in the arcuate portions of the composite disc, the annular width of the radial sector positioned in proximity to the drive periphery radius being at least substantially equal to the radial depth of the contact face of the reaction member, strengthening of said arcuate portions being provided during fabrication of the composite structure by greater axial compaction of laid up laminae in at least part of the drive region than those in the friction region prior to bonding of the laminae, the fibre being carbon fibre in a composite structure being a carbon-carbon composite structure with the fibre volume fraction in the drive region being at least 10% greater than the fibre volume fraction in the friction region.

17. The brake disc of claim 16 wherein said strength is compressive strength.

18. A brake disc for use in a multi-disc brake said disc having an annular friction region adapted in use to have an annular friction surface disposed at an axial side face of the disc and having radially of said friction region a generally annular peripheral drive region comprising arcuate portions separated by a plurality of circumferentially spaced keyways extending radially from the drive periphery of the drive region remote from said friction region and adapted in use to transmit the torque generated at the friction surface to at least one reaction member in an associated wheel and brake assembly wherein said disc comprises a plurality of laminae each substantially parallel to said friction surface said laminae each comprising an assemblage of fibres in which the plurality of laminae and the fibres therein are bonded together by a matrix material said disc wherein in that within a radial section or radial sector the fibre volume fraction is substantially constant and the fibre volume fraction in a radial sector positioned in proximity to the drive periphery radius is greater than the fibre volume fraction in a radial section positioned in proximity to the non-drive periphery radius to provide a composite brake disc wherein the thermal conductivity is higher in the annular friction region than in the drive region.

19. A laminated carbon fibre preform adapted for use in the brake disc of claim 18.

20. A method of fabricating a generally annular fibre-reinforced composite brake disc having an annular friction region adapted in use to have an annular friction surface disposed axially of the disc and having radially of said friction region a generally annular peripheral drive region comprising arcuate portions separated by a plurality of circumferentially spaced keyways extending radially from the drive periphery of the drive region remote from said friction region and adapted in use to transmit the torque generated at the friction surface to at least one reaction member in an associated wheel and brake assembly in which a plurality of generally annular laminae are laid up co-axially relative to one another said laminae each comprising an assemblage of fibres wherein in that in the method, the laid up laminae are compacted axially between platens of a compression fixture to provide a laminae assembly in which the fibre volume fraction within a radial section or radial sector is substantially constant and the fibre volume fraction in a radial sector positioned in proximity to the drive periphery radius is greater than the fibre volume fraction in a radial section positioned in proximity to the non-drive periphery radius; and the laminae assembly and the fibres therein are infiltrated with and bonded together by a matrix material to provide a composite brake disc wherein the compressive strength of the composite material is higher in proximity to the drive periphery radius than in proximity to the non-drive periphery radius thereby to provide improved tangential load bearing characteristics in the arcuate portions of the composite disc.

21. A method in accordance with claim 20 wherein the fibres are of a carbon fibre precursor material that is subsequently converted to carbon fibre.

22. A method in accordance with claim 20 wherein at least one of the compression fixture platens is provided with a stepped profile adapted to compress the drive region axially to a greater extent than the friction region.

23. A method in accordance with claim 20 wherein the method comprises the further step of needle punching the laminae assembly to provide a free-standing consolidated preform that can be moved from the compression fixture on which it is initially laid up prior to infiltration with said composite matrix material.

24. A method in accordance with claim 20 wherein the method comprises the further step of needle punching the laminae assembly, only within the drive region.

25. A method of fabricating a generally annular fibre-reinforced composite brake disc having an annular friction region adapted in use to have an annular friction surface disposed axially of the disc and having radially of said friction region a generally annular peripheral drive region comprising arcuate portions separated by a plurality of circumferentially spaced keyways extending radially from the drive periphery of the drive region remote from said friction region and adapted in use to transmit the torque generated at the friction surface to at least one reaction member in an associated wheel and brake assembly in which a plurality of generally annular laminae segments each comprising an assemblage of fibres are radially disposed to provide a helical annulus and adjacent segments within the helical annulus have fibres of each segment disposed at an angle to fibres of helically-contacting adjacent segments and characterised in that in the method, the laid up laminae are compacted axially between platens of a compression fixture to provide a laminae assembly in which the fibre volume fraction within a radial section or radial sector is substantially constant and the fibre volume fraction in a radial sector positioned in proximity to the drive periphery radius is greater than the fibre volume fraction in a radial section positioned in proximity to the non-drive periphery radius; and the laminae assembly and the fibres therein are infiltrated with and bonded together by a matrix material to provide a composite brake disc wherein the compressive strength of the composite material is higher in proximity to the drive periphery radius than in proximity to the non-drive periphery radius thereby to provide improved tangential load bearing characteristics in the arcuate portions of the composite disc.

26. A method in accordance with claim 25 wherein the said angle is substantially 90°.

* * * * *